United States Patent
Flannery

(10) Patent No.: US 7,646,977 B2
(45) Date of Patent: Jan. 12, 2010

(54) DEPTH OF FIELD BRACKETING

(75) Inventor: Michael R. Flannery, Sioux City, IA (US)

(73) Assignee: Gateway, Inc., North Sioux City, SD (US)

( * ) Notice: Subject to any disclaimer, the term of this patent is extended or adjusted under 35 U.S.C. 154(b) by 381 days.

(21) Appl. No.: 11/654,449

(22) Filed: Jan. 17, 2007

(65) Prior Publication Data

US 2008/0170847 A1    Jul. 17, 2008

(51) Int. Cl.
*G03B 7/00* (2006.01)
*H04N 5/238* (2006.01)
(52) U.S. Cl. .................. 396/222; 348/362; 348/363
(58) Field of Classification Search .......... 396/222, 396/213, 322; 348/362, 363, 367
See application file for complete search history.

(56) References Cited

U.S. PATENT DOCUMENTS

2005/0062875 A1*  3/2005  Ojima .................. 348/362

OTHER PUBLICATIONS

Mitch Moraski, 8 Steps to Succeccful Nature Photography, website, 1-6, USA.
John A. Lind, The Art of Photography, website, 1-3, USA.
50mm Hyperfocal, discussion forum, Mar. 31, 2004, 1-9, USA.

* cited by examiner

*Primary Examiner*—Rochelle-Ann J Blackman
(74) *Attorney, Agent, or Firm*—Pearne & Gordon LLP

(57) ABSTRACT

Methods and Systems are provided to enable automatically taking a series of depth of field bracket photos by varying the f-stop and shutter speed for a particular scene to keep the exposure constant. The method may be practiced on a digital camera which has been equipped with software in accordance with the present invention.

20 Claims, 5 Drawing Sheets

TABLE 1
Depth of Field Values
(For 35mm camera with focal length = 50mm)

| Distance (feet) | f/1.4 | | f/2 | | f/2.8 | | f/4 | | f/5.6 | | f/8 | | f/11 | | f/16 | | f/22 | | f/32 | |
|---|---|---|---|---|---|---|---|---|---|---|---|---|---|---|---|---|---|---|---|---|
| | Near | Far | Near | Far | Near | Far | Near | Far | Near | Far | Near | Far | Near | Far | Near | Far | Near | Far | Near | Far |
| 1 | 1.00 | 1.00 | 0.99 | 1.01 | 0.99 | 1.01 | 0.99 | 1.01 | 0.98 | 1.02 | 0.98 | 1.03 | 0.97 | 1.04 | 0.95 | 1.05 | 0.94 | 1.07 | 0.91 | 1.11 |
| 2 | 1.98 | 2.02 | 1.97 | 2.03 | 1.96 | 2.04 | 1.95 | 2.06 | 1.93 | 2.08 | 1.90 | 2.11 | 1.86 | 2.16 | 1.81 | 2.24 | 1.74 | 2.36 | 1.65 | 2.55 |
| 3 | 2.96 | 3.04 | 2.94 | 3.06 | 2.91 | 3.09 | 2.88 | 3.13 | 2.83 | 3.19 | 2.77 | 3.27 | 2.68 | 3.40 | 2.57 | 3.60 | 2.43 | 3.92 | 2.25 | 4.49 |
| 4 | 3.92 | 4.08 | 3.89 | 4.12 | 3.85 | 4.17 | 3.79 | 4.24 | 3.71 | 4.34 | 3.60 | 4.51 | 3.45 | 4.75 | 3.27 | 5.16 | 3.04 | 5.86 | 2.76 | 7.26 |
| 5 | 4.88 | 5.13 | 4.83 | 5.18 | 4.76 | 5.26 | 4.67 | 5.38 | 4.55 | 5.56 | 4.38 | 5.82 | 4.17 | 6.25 | 3.90 | 6.97 | 3.57 | 8.34 | 3.19 | 11.5 |
| 6 | 5.82 | 6.19 | 5.75 | 6.27 | 5.66 | 6.39 | 5.53 | 6.56 | 5.35 | 6.82 | 5.12 | 7.24 | 4.83 | 7.91 | 4.47 | 9.11 | 4.05 | 11.6 | 3.56 | 18.9 |
| 7 | 6.76 | 7.26 | 6.67 | 7.37 | 6.54 | 7.53 | 6.36 | 7.78 | 6.13 | 8.15 | 5.83 | 8.75 | 5.46 | 9.76 | 5.00 | 11.7 | 4.47 | 16.1 | 3.89 | 35.0 |
| 8 | 7.69 | 8.34 | 7.57 | 8.49 | 7.40 | 8.71 | 7.18 | 9.04 | 6.88 | 9.55 | 6.51 | 10.4 | 6.04 | 11.8 | 5.48 | 14.8 | 4.85 | 22.8 | 4.17 | 97 |
| 9 | 8.61 | 9.43 | 8.45 | 9.62 | 8.25 | 9.91 | 7.97 | 10.3 | 7.61 | 11.0 | 7.15 | 12.1 | 6.59 | 14.2 | 5.93 | 18.6 | 5.20 | 33.5 | 4.42 | ∞ |
| 10 | 9.52 | 10.5 | 9.33 | 10.8 | 9.08 | 11.1 | 8.74 | 11.7 | 8.31 | 12.6 | 7.77 | 14.0 | 7.11 | 16.9 | 6.35 | 23.6 | 5.51 | 54 | 4.65 | ∞ |
| 12 | 11.3 | 12.8 | 11.0 | 13.1 | 10.7 | 13.7 | 10.2 | 14.5 | 9.64 | 15.9 | 8.91 | 18.4 | 8.05 | 23.5 | 7.09 | 39.0 | 6.06 | 587 | 5.03 | ∞ |
| 14 | 13.1 | 15.1 | 12.7 | 15.6 | 12.2 | 16.3 | 11.6 | 17.6 | 10.9 | 19.6 | 9.97 | 23.5 | 8.90 | 32.8 | 7.74 | 74 | 6.53 | ∞ | 5.34 | ∞ |
| 16 | 14.8 | 17.4 | 14.3 | 18.1 | 13.7 | 19.1 | 13.0 | 20.8 | 12.1 | 23.8 | 10.9 | 29.8 | 9.67 | 46.4 | 8.30 | 218 | 6.92 | ∞ | 5.61 | ∞ |
| 18 | 16.5 | 19.8 | 15.9 | 20.7 | 15.2 | 22.1 | 14.3 | 24.4 | 13.1 | 28.5 | 11.8 | 37.6 | 10.4 | 69 | 8.81 | ∞ | 7.27 | ∞ | 5.83 | ∞ |
| 20 | 18.1 | 22.3 | 17.5 | 23.4 | 16.6 | 25.2 | 15.5 | 28.2 | 14.2 | 33.9 | 12.7 | 47.7 | 11.0 | 112 | 9.26 | ∞ | 7.57 | ∞ | 6.02 | ∞ |
| 30 | 26.0 | 35.5 | 24.6 | 38.4 | 22.9 | 43.4 | 20.9 | 53 | 18.5 | 78 | 16.0 | 236 | 13.4 | ∞ | 10.9 | ∞ | 8.65 | ∞ | 6.68 | ∞ |
| 40 | 33.2 | 50 | 31.0 | 56 | 28.3 | 68 | 25.3 | 96 | 21.9 | 228 | 18.5 | ∞ | 15.1 | ∞ | 12.0 | ∞ | 9.31 | ∞ | 7.06 | ∞ |
| 50 | 39.8 | 67 | 36.6 | 79 | 33.0 | 103 | 28.9 | 185 | 24.6 | ∞ | 20.3 | ∞ | 16.3 | ∞ | 12.8 | ∞ | 9.76 | ∞ | 7.32 | ∞ |
| 75 | 54 | 122 | 48.5 | 166 | 42.3 | 332 | 35.8 | ∞ | 29.4 | ∞ | 23.5 | ∞ | 18.3 | ∞ | 13.9 | ∞ | 10.4 | ∞ | 7.69 | ∞ |
| 100 | 66 | 207 | 58 | 371 | 49.2 | ∞ | 40.6 | ∞ | 32.6 | ∞ | 25.5 | ∞ | 19.5 | ∞ | 14.6 | ∞ | 10.8 | ∞ | 7.88 | ∞ |
| ∞ | 193 | ∞ | 137 | ∞ | 97 | ∞ | 69 | ∞ | 48.5 | ∞ | 34.3 | ∞ | 24.3 | ∞ | 17.3 | ∞ | 12.2 | ∞ | 8.71 | ∞ |
| Hyperfocal Distance | 193 | | 137 | | 97 | | 69 | | 48.5 | | 34.3 | | 24.3 | | 17.3 | | 12.2 | | 8.71 | |

FIG. 2

DEPTH OF FIELD BRACKETING

BACKGROUND

1. Field

The present invention relates to photography, and more specifically systems and methods of taking pictures with digital cameras.

2. Background

Digital cameras have helped to simplify many of the complexities of picture taking for novices, while at the same time offering a wide variety of controls for sophisticated users. Novice users can set their digital cameras to an automatic mode, allowing them to simply point and shoot while taking pictures. More advanced users can control and adjust a wide variety of camera parameters to optimize the camera settings for the given conditions or achieve various special effects in their photographs.

One advantage of digital cameras is that a user can instantaneously review a photograph which has just been taken. Since the images are stored digitally, it is simply a matter of retrieving the picture from the camera's memory to be displayed on the digital display or viewfinder. However, even though a photograph can be easily and conveniently reviewed, minor imperfections in the image may not be apparent due to the small size of the view finder. It is oftentimes difficult to tell whether the camera had appropriate lighting or exposure settings when viewing a digital photograph on a tiny electronic display or viewfinder. The photographer may not be aware of minor imperfections due to the parameter settings of the camera until the photograph is printed out, thus resulting in a lost photo opportunity.

There are precautions that can be taken to avoid ending up with a flawed photo taken with improper settings or parameters. To avoid photos which are under exposed or over exposed, photographers can take a series of pictures which are exposure bracketed, sometimes called auto exposure bracketing (AEB). Typically three to five pictures are taken, each picture being taken at a different exposure setting. In this way, the photographer can review each of the pictures taken, and select the photo with the best exposure setting. Digital cameras may also include other bracketing options such as white balance bracketing which ensures that the photo has the proper blue/amber bias and magenta/green bias.

Another problem which can occur in photography is a picture taken slightly out of focus. To avoid photographs which are out of focus, some sophisticated cameras have been equipped to use a focus bracketing procedure in which the camera takes three exposures with varying focus points. A drawback of focus bracketing is that while it may save a picture that would have otherwise had the primary subject out of focus, it does not help to avoid depth of field problems. Photographers using manually adjustable analog or digital cameras can use manual depth of field (DOF) bracketing to increase the likelihood of ending up with a photograph which has the amount of depth of field that the photographer desires. Depth of field bracketing involves taking several pictures with different DOFs by manually varying both the aperture and the shutter speed to have multiple exposures taken at the same illumination level, but with different DOFs. Although DOF bracketing may be done manually by photographers, no camera today incorporates the ability to have the camera automatically take a series of exposures where the illumination level remains constant, but the DOF varies.

One major drawback in attempts to use DOF bracketing is that the camera must be manually adjusted for each photograph, a process which takes considerable time sometimes resulting in changes in the lighting level of the subject, considerable movement of the subject or other condition changes in the scene. When the light level in the scene to be photographed changes, it is either very difficult or impossible to take the additional photos needed for DOF bracketing. Moreover, quite often the photographer wants some portions of the photo to be in focus, while other portions of the photo are purposefully out of focus, in order to achieve a desired effect. There is no method or system for DOF bracketing which is automatic and which allows a portion of the picture to be purposefully left out of focus.

What is needed is a method and system of DOF bracketing which adjusts the camera rapidly enough to avoid changes in the lighting or position of the subject, and is suitable for leaving portions of the photo purposefully out of focus.

SUMMARY

Embodiments disclosed herein address the above stated needs by providing systems, methods and/or software instructions for taking depth of field bracketed photos with a camera. The camera is adjusted for its initial aperture and shutter speed settings which are associated with the initial depth of field, and the exposure level is noted. The camera may be adjusted either manually by the user, or by using automatic settings. A first photo is taken at the initial aperture and shutter speed settings in response to the user activating a shutter release of the camera. Then, in response to the initial shutter release command, the camera is adjusted to a second aperture and shutter speed setting associated with a second depth of field at the same exposure level, and a second photo is taken. In some embodiments three or more photos are taken at various aperture and shutter speed settings for the same exposure level.

In some embodiments the second depth of field is less than the first depth of field and the third depth of field it greater than the first depth of field. In other embodiments the second depth of field is greater than the first depth of field and the third depth of field is less than the first depth of field.

In some embodiments a first distance from a first subject to be photographed is within each of the first depth of field, the second depth of field and the third depth of field. A second subject to be photographed may be beyond a far side of each of the first depth of field and the second depth of field, but not be beyond the far side of the third depth of field. In some embodiments the first subject in the first depth of field is in sharp focus and the second subject beyond the first depth of field is not in sharp focus with the camera set to the first aperture and shutter speed settings.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 2 provides a table of DOF values for determining the DOF from various distances to the primary subject;

DETAILED DESCRIPTION

In photography, depth of field (DOF) concerns the distance from the point where a lens is focused and where the image is perceptively out of focus. Depth of field is the distance between the nearest point and the farthest point in the photograph that is perceived in acceptably sharp focus along a common image plane. In other words, the depth of field is the range of distances from the camera lens to various objects over which the objects appear to be sharp. In theory, objects will be perfectly focused at only one distance from the camera for a give focal length adjustment. In practice, however, objects within the DOF range are acceptably sharp, for the purposes of photography. For camera settings focused on a relatively close subject, the plane of focus sits approximately one third of the way back into the DOF away from the camera. That is, one third of the DOF extends towards the camera and two thirds extend away from the camera behind the point the camera is focused on.

DOF can be used by photographers to create stylized images by manipulating the portion of the image that appears out of focus. For example, in some cases a photographer may want the primary subject to be in focus, but the background to be blurred. This requires a shallow DOF. Unfortunately, too shallow of a DOF can result the subject being partially out of focus too. The tiny display window viewfinders on today's digital cameras are much too small to be able to determine how much of a subject is in focus.

The amount of DOF can be controlled in a camera by changing the aperture setting (f-stop) and shutter speed of the camera. Changing the aperture varies the size of the mechanical diaphragm opening that passes light through to the lens, thus letting either more or less light onto the sensor or film. As the aperture is adjusted to be larger, a faster shutter speed is used to maintain the same amount of light coming in during the exposure. The larger the aperture, the shallower the DOF, and inversely, smaller apertures have deeper DOFs. The distance to the primary subject being focused on also affects the DOF. The farther away the primary subject is from the camera, the greater the DOF, while a primary subject that is closer to the camera will have a smaller DOF.

Figure 1:
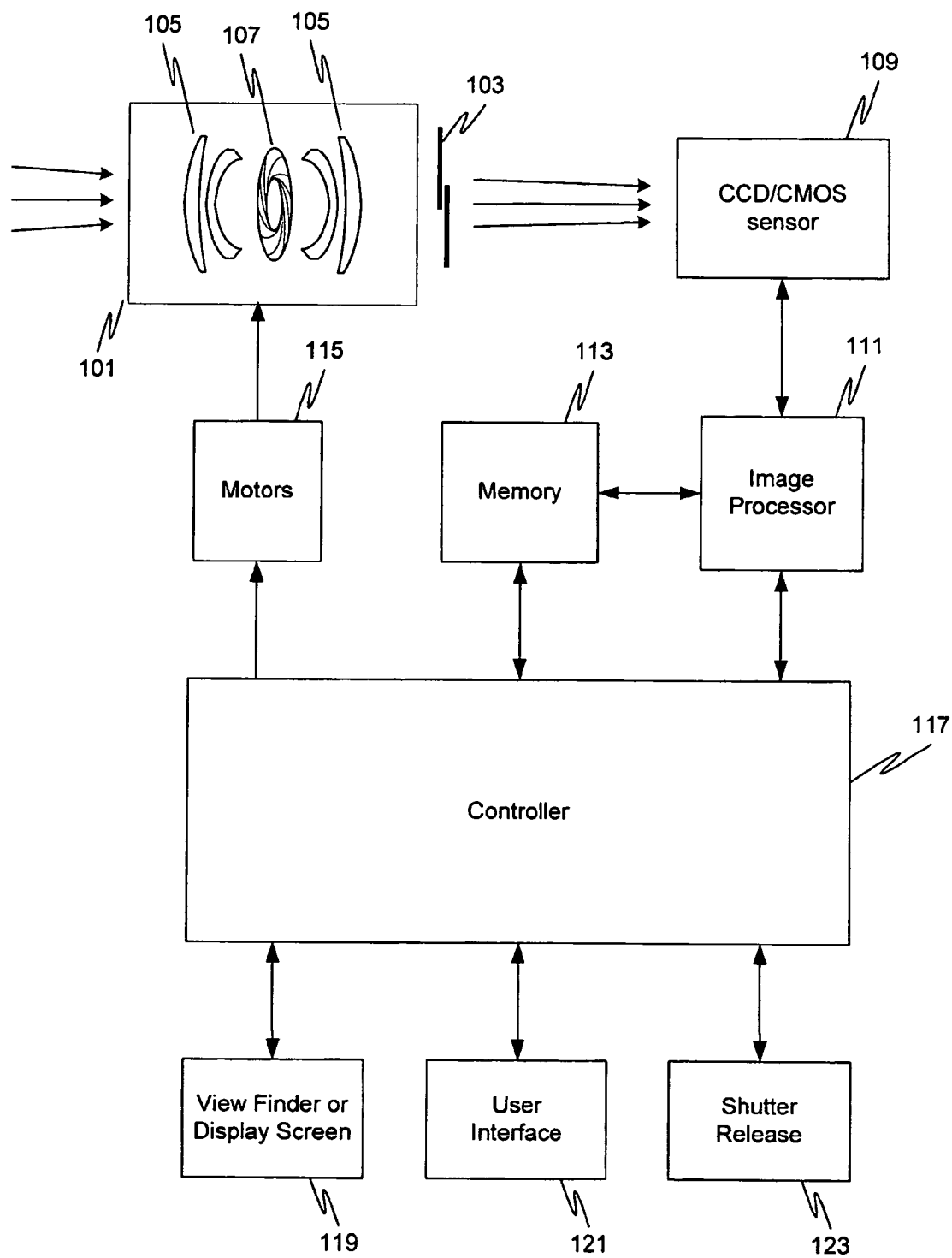
FIG. 1 depicts an exemplary block diagram of a camera for carrying out various embodiments of the invention.

FIG. 1 depicts an exemplary block diagram of a camera assembly 100 for carrying out various embodiments of the invention. In the figure, lens assembly 101 includes the camera's lenses 105 and an aperture 107. Depending upon the design of a particular type of camera, the aperture 107 may be located in different parts of the light path in relation to the lenses 105, or even amongst the lenses 105 in some cameras, as shown in the figure. Sometimes the aperture 107 is not configured as part of the camera's lens assembly 101, being located either in front or behind the lens assembly 101.

The shutter assembly 103 is used to control the time that light is allowed to act on the sensor or film of the camera. A diaphragm shutter, which may be located amongst the lenses 105 of the lens assembly 101, is one type of shutter assembly 103 typical in camera designs. Another typical type of shutter assembly 103, commonly used in single lens reflex (SLR) cameras, is the focal plane shutter. A focal plane shutter is typically located in the camera body. The aperture 107 is a circular hole used to control the amount of light passing onto the camera's sensor 109 or film. The size of the aperture hole for allowing different amounts of light through is indicated with f numbers, sometimes called f-stops. Diaphragm apertures are one of the most common types used in various camera designs. Diaphragm apertures have overlapping leaves, or blades, which scissor in upon each other to vary the circular size of the aperture opening. The shutter assembly 103, lenses 105, and aperture 107 are operated and adjusted by actuators and motors represented in FIG. 1 as motors 115. A power supply (not shown) in the form of either a battery or connection to an AC-DC adapter provides current at a specified voltage to power the components of camera assembly 100.

Light passing through the lens assembly 101 and shutter assembly 103 is detected by the sensor unit 109. Typically, the sensor unit 109 in a digital camera is either a charge-coupled device (CCD) sensor or a complementary metal oxide semiconductor (CMOS) sensor, although it is anticipated that other types of sensors may be suitable. The sensor unit 109 turns the light incident upon it into electrons, creating an analog electrical signal which represents the image exposed to the sensor. The sensor unit 109 passes the signal to an image processor 111. The image processor 111 may include a digital front end which contains a high speed analog to digital (A/D) converter. The digital front end may also be configured as a separate unit located between the sensor 109 and image processor 111. The digital front end filters, amplifies and digitizes the signal received from the sensor 109. The signal is further processed by the image processor 111 subject to various imaging, audio and video algorithms which typically conform to industry standards.

The image processor 111 stores the processed signal, which now encodes a digital photograph, to memory 113. The memory 113 stores photographic image data as well as the software or other executing code for the camera assembly 100. Memory 113 may be configured as a single unit, in the form of multiple units, or distributed throughout the units of the camera assembly 100. The memory 113 may be embodied in the form of one or more of ram memory, flash memory, hard disk, CD, or any other computer readable medium as recognized by those of ordinary skill in the art. The various units of the camera assembly 100 operate partially or wholly under the control of controller 117 which receives instructions from software or other executing code for the camera assembly 100.

The camera assembly 100 includes a view finder or display screen 119 which displays to the photographer the view to be photographed. Even though the photographer can see the image to be photographed in the view finder 119, it is often difficult to see minor imperfections in the image due to the small size of the view finder. For example, it is oftentimes difficult to tell whether the camera has appropriate lighting or exposure settings when viewing a digital photograph on a tiny electronic display or viewfinder. The camera assembly 100 also includes various controls and switches configured to be manipulated by the photographer to adjust the settings of the camera, input data and select the available options and modes of the camera. The various controls and switches of camera assembly 100 are represented as user interface 121 in the figure. Finally, the camera assembly 100 has a shutter release control 123. Typically, the shutter release control 123 is configured as a button on the camera body, but may be any form of control or input capable of being manipulated by the photographer in order to instruct the camera to take a photograph.

With the design of today's digital cameras, implementing the DOF bracketing according to the various embodiments disclosed herein may be implemented through changes to the software programming of camera assembly 100, typically stored in memory 113. The various embodiments may be implemented without requiring physical hardware changes to a particular digital camera design. In accordance with some embodiments, the software allows the photographer to set the amount of bracketing in terms of aperture f-stops. The camera 100 then takes an exposure at the DOF of the current camera settings. The camera 100 also takes two additional exposures. In one exposure, the camera 100 increases the aperture by the amount pre-defined by the user and correspondingly increases the shutter speed to result in an exposure equivalent to the first. The shutter speed may either be set based on a calculation (e.g., if the aperture is increased by one f-stop, the shutter speed would be increased one f-stop) or it could be adjusted based on direct light measurements by the camera. The camera would then take a third exposure going with a reduced aperture and a slower shutter speed.

The equations below can be used to calculate hyperfocal distance and DOF. Hyperfocal distance is the nearest distance from the camera for which the focus is considered acceptably sharp while at the same time the lens is also focused out to infinity.

$$\text{hyperfocal distance: } H = \frac{f^2}{N \times c} + f \quad (1)$$

$$\text{near side of DOF: } D_n = \frac{s(H-f)}{H+s-2f} \quad (2)$$

$$\text{far side of DOF: } D_f = \frac{s(H-f)}{H-s} \quad (3)$$

The variables in the above equations represent the following: H is the hyperfocal distance. $D_n$ is the near side of DOF, that is, the boundary of the DOF closest to the camera. $D_f$ is the far side of DOF, that is, the boundary of the DOF furthest away from the camera. The variable s represents the focal distance. The variable f is the focal length of the lens, in mm. The variable N is the f-number. The variable c is the circle of confusion. A circle of confusion is a small disk of light on an image which corresponds to a point of light from the subject. As the subject becomes better focused, the disks of light reduce in size. When the disks of light appear to be points, the image is considered to be acceptably sharp, that is, focused.

FIG. 2 provides a table of DOF values for determining the DOF from various distances to the primary subject. The table in FIG. 2 provides an alternative way of determining the DOF. This exemplary table is based on a 35 mm camera with a focal length of 50mm, calculated for a 0.03mm value for the circle of confusion. Similar tables may readily be created for changes in any of these parameters by using equations (1), (2) and (3) above. The f/5.6, f/11 and f/22 values for the distance of 12 feet to the subject have been highlighted in the table to aid in an explanation of DOF in the ensuing paragraphs.

Figure 3A:
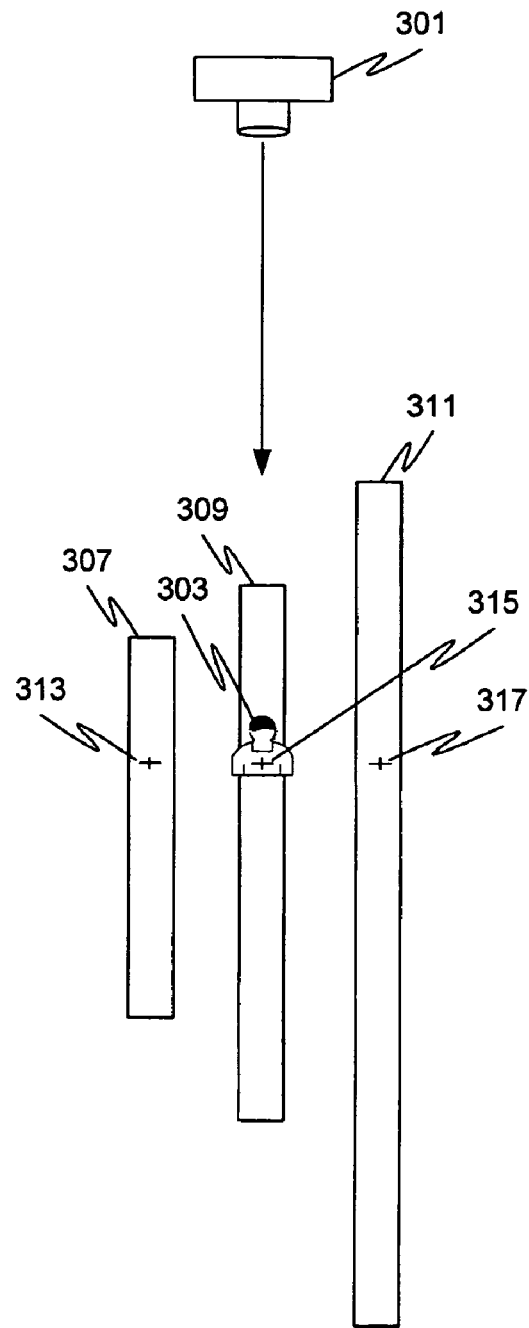
FIGS. 3A and 3B are illustrations for use in explaining aspects of depth of field bracketing as it relates to the positioning of one or more subjects and the camera.
Figure 3B:
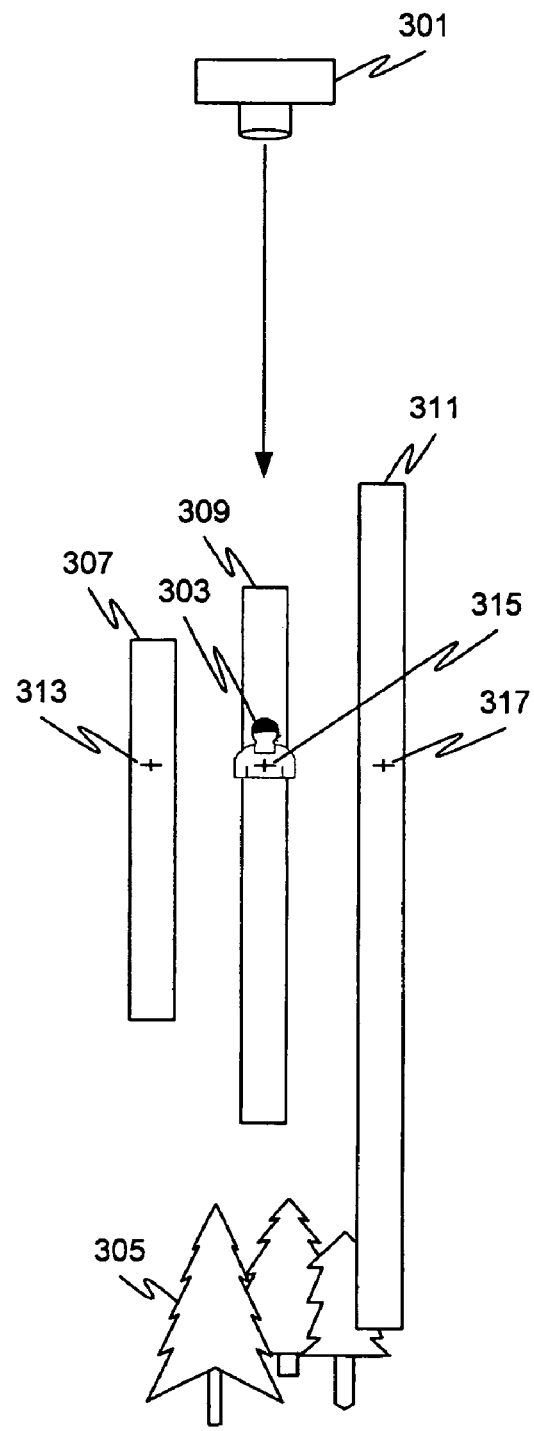

FIGS. 3A and 3B are illustrations which may be useful in explaining aspects of depth of field bracketing as it relates to the positioning of the camera 301, a primary subject 303 and a secondary subject 305. In FIG. 3A the photographer is only concerned with capturing the subject 303. In FIG. 3B the photographer seeks to capture the primary subject 303 and also the background subject 305. The background subject 305 may either be photographed in focus, or purposefully left fuzzy and out of focus as an effect of the picture. In some instances a photographer may want to capture subjects nearer than the primary subject 303, with the nearer subject purposefully left out of focus while the primary subject 303 is adequately sharp. This would occur when the near subject is in front of the DOF range.

The three rectangles in each figure represent three different DOF ranges 307, 309 and 311 to be used in DOF bracketing for a particular scene. The three rectangles may be thought of as stripes painted on the ground which represent DOF ranges 307, 309 and 311 (although in reality the DOF ranges extend from the point on primary subject 303 where the lens is being aimed back to the lens, e.g., three feet above the ground). Each of the DOF ranges 307, 309 and 311 are associated with the camera being adjusted to different settings for f-stop and shutter speed so as to maintain the same exposure level for all three photos. This may be more easily understood by assigning some actual values from the DOF table provided in FIG. 2. For example, if the primary subject is 12 feet from the camera (a 35mm camera with a 50mm focal length) which is set to f/5.6, the near DOF distance is 9.64 feet and the far DOF distance is 15.5 feet for DOF 307, as can be seen by reference to Table 1 of FIG. 2. (Note that the figure is not drawn to scale.) With the camera set to f/11 the near DOF distance becomes 8.05 feet while the far DOF distance is 23.5 feet for DOF 309. Setting the camera to f/22 produces a near DOF distance is 3.06 feet and the far DOF distance is 587 feet for DOF 311. As the aperture is adjusted to be larger (adjusted to a smaller f-stop number) the DOF becomes shallower, with the near edge of the DOF range moving away. On the other hand, as the aperture is adjusted to be smaller (to a larger f-stop number) the DOF range increases in size and moves toward the camera.

In the figure, the marks labeled as 313, 315 and 317 indicate the center of focus point within each of the DOF ranges 307, 309 and 311, respectively. It should be noted that the center of focus point does not fall in the center of the DOF range, and will typically remain the same distance from the camera for all three of the photographs. As a rule of thumb, the center of focus point is approximately one-third of the way into the DOF range away from the camera, for DOFs of a few dozen feet or less. However, as the far end of the DOF away from the camera approaches infinity this rule of thumb ceases to be true.

In FIG. 3A, each of the DOF ranges 307, 309 and 311 would be suitable for taking a photograph of primary subject 303 since the photographer is interested in capturing only the primary subject 303 without regard to what is shown behind or in front of 303. However, in FIG. 3B the photographer also has a secondary background subject 305 to consider. If the photographer wants to keep background subject 305 in sharp focus, then only the camera settings which provide DOF range 311 are acceptable. DOF 311 is the only of the three ranges that cover the background subject 305, thus keeping subject 305 in sharp focus. On the other hand, photographers sometimes want to create a photograph in which the primary subject 303 is sharp but the background subject 305 remains out of focus. In this case, the photographer could opt for the camera settings associated with either DOF 307 or DOF 309, both of which will produce a background subject 305 which appears out of focus. An added advantage of DOF bracketing is that the photographer does not have to determine exactly how much depth of field they want at the time the photograph is taken. Instead, the final photograph can be selected at a later time after reviewing the images on a larger display.

Figure 4:
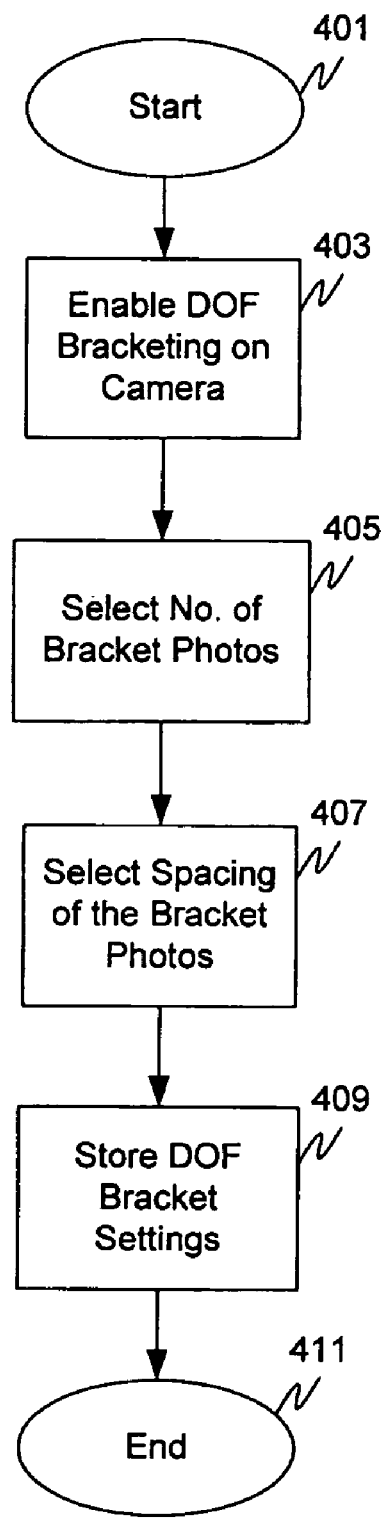
FIG. 4 is an exemplary flowchart depicting a method of selecting the parameters for use in DOF bracketing according to various embodiments of the invention.

FIG. 4 is an exemplary flowchart 400 depicting a method of selecting the parameters for use in DOF bracketing according to various embodiments of the invention. The method begins at 401 and proceeds to 403 where the user, or photographer, enables the DOF bracketing option on their camera. Once the photographer enables DOF bracketing, the method proceeds to 405.

At 405, the photographer is allowed to select the number of photos to be taken in the series of DOF bracket photos. Generally, a DOF bracket consists of three to seven photographs of differing f-stop and shutter speed combinations selected to provide a consistent exposure. However, any number of photos which is two or more could be used for DOF bracketing. In some embodiments, the number of photos to be used in DOF bracketing may be automatically selected in block 405, for example, using an algorithm or default value. The algorithm may be based on the relative proximity of the primary subject to a secondary subject, especially in the situation where the primary subject is to be in focus while a secondary subject is out of focus. For example, taking the inverse of one minus the ratio of the secondary subject distance over the primary subject distance yields a number which increases as the primary subject distance approaches the secondary subject distance. This technique uses more DOF bracketing attempts when the primary and secondary subjects are closer together in an attempt to place the far edge of the DOF range between the primary and secondary subjects. In some embodiments a fixed number (e.g., two) may be added to this algorithmic result to automatically determine the number of photos to be used in the DOF bracketing. In some embodiments, the options for the number of photos to be taken will only be odd numbers (e.g. three, five or seven). In these embodiments, the camera would take one photo base on the current settings of the camera (i.e., as if DOF bracketing was not enabled) and then it would take an equal number of photos with less DOF and more DOF than the initial photo. Once the number of photos for DOF bracketing has been determined in 405 the method proceeds to 407.

In 407 photographer selects the amount of DOF difference there should be between each of the photos taken during DOF bracketing. In some embodiments, the amount of difference could be defined in f-stop differences in the aperture setting. For example, if the setting of one f-stop was selected and in 405 the photographer had chosen three for the number of photos, then the camera might use a series of f-stops of f/4, f/5.6 and f/8 with corresponding shutter speed changes to maintain a similar amount of light coming into the camera. After the amount of DOF difference has been selected, then the method proceeds to 409.

In 409 the various DOF bracketing settings and parameters are stored within the camera for use in taking DOF bracketing photos. The DOF bracketing settings and parameters, among other things, define the photographer's preferences in taking DOF bracketing photos. The DOF bracketing settings and parameters may serve as a set of default settings, which can be over-ridden by the photographer at the time of the photography session in order to best suit the needs of the situation. The settings may be stored in a memory 113 depicted in FIG. 1, or in any other memory of the camera deemed appropriate. Upon storing the DOF bracketing settings the method proceeds to 411 and ends.

Figure 5:
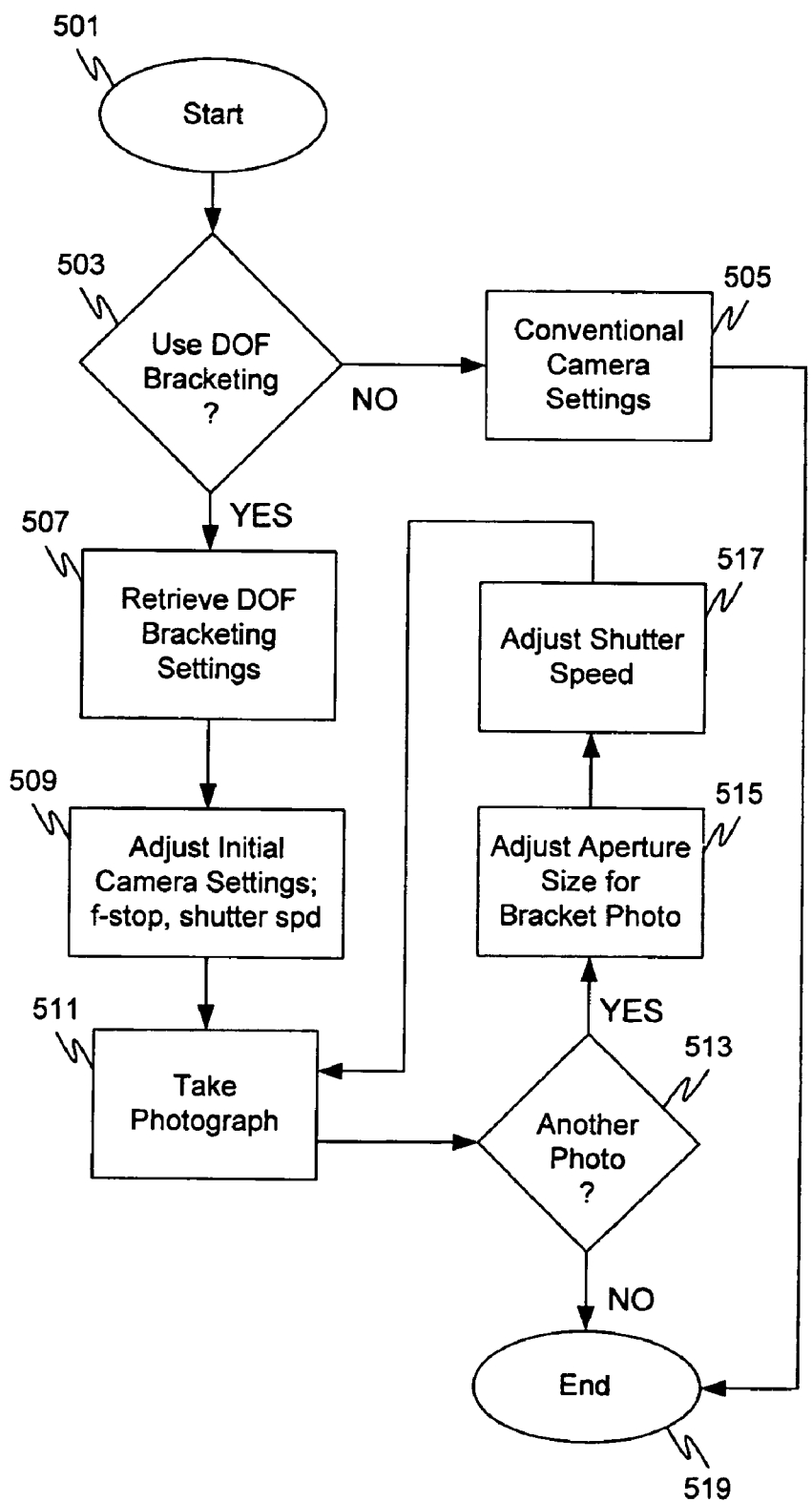
FIG. 5 is an exemplary flowchart depicting a method of DOF bracketing according to various embodiments of the invention.

FIG. 5 is an exemplary flowchart depicting a method 500 of DOF bracketing according to various embodiments of the invention. The method begins at 501 and proceeds to 503 where it is determined whether or not DOF bracketing is to be used for photographing a scene. If DOF bracketing is not to be used the method proceeds along the "NO" branch to 505 to use conventional camera settings, taking one picture at a time with the camera settings selected by the photographer. The method then proceeds from 505 to 519 and ends. Back in 503, if it is determined that DOF bracketing is to be performed; the method proceeds from 503 along the "YES" branch to 507. In 507 the DOF bracket settings and parameters are retrieved from memory. The DOF bracket settings and parameters, as set up in the method of FIG. 4, define the options and preferences the photographer has for taking a series of DOF bracket photos. Typically, it is preferable to select at least some of the settings and parameters ahead of time and store them, to make the process of taking pictures more efficient and organized. Alternatively, the parameters and settings for taking DOF bracket photos can be defined at the time the photos are being taken.

Once the settings and parameters are retrieved from memory the method proceeds to 509. In 509 the camera, for example, under control of controller 117 of FIG. 1, is set up in accordance with the DOF bracket settings and parameters. In addition to implementing the DOF bracket settings and parameters, the block 509 entails the photographer making adjustments to the camera controls. For example, in 509 the photographer may set the initial f-stop and shutter speed, may focus the lens on the primary subject, may determine the distance to the primary subject, measure the lighting conditions, or any other activities the photographer normally engages in before taking a photograph. The photographer may opt to set the camera in an automatic mode so that some, or all, of these adjustments are made automatically by the camera. At lease some of the parameters to be used in the DOF bracketing photos depend upon these initial adjustments by the photographer. For example, in taking a series of DOF bracket photos, the camera f-stop and shutter speed are both adjusted in a manner calculated to keep the exposure constant for all photos. Once the initial camera settings are completed the method proceeds from 509 to 511.

In 511 a photograph is taken by the camera in accordance with the settings and adjustments either made by the photographer in 509 and the DOF bracket settings and parameters retrieved from memory in 507, or else made by the system in 517 if the photograph is not the first in the DOF bracketing series. Upon taking the photo the method proceeds to 513.

Once the photo has been taken in 511 the method proceeds to 513 to determine whether more DOF bracketing photos are to be taken. Typically, the number of DOF bracket photos to be taken is predetermined and stored within the DOF bracket settings and parameters, as determined in the method depicted in FIG. 4. However, the photographer may select a particular number of photos to be taken in a series to suit the needs of the situation. In any case, if, in 513, it is determined that no further DOF bracketing photos are required, the method proceeds in accordance with the "NO" branch from 513 to 519 where the method ends. However, if it is determined in 513 that one or more additional DOF bracketing photos are required, the method proceeds from 513 in accordance with the "YES" branch to 515 to take make the necessary adjustments for another photograph.

In 515 the aperture is adjusted for another photo of the DOF bracketing series. The selection for the next aperture size may be made based on the DOF bracket settings and parameters, or may be selected by the photographer. Upon adjusting the aperture the method proceeds from 515 to 517 to adjust the shutter speed. As mentioned above, the process of taking DOF bracketing photos entails taking two or more photos having a constant exposure. Hence, the f-stop aperture setting selected in 515 determines the shutter speed to be used in 517. Once the shutter speed has been set the method proceeds back to 511 to take another photograph in the DOF bracketing series. It should be noted that the second photo, and all subsequent photos, in the DOF bracketing series are taken under control of the camera in response to the photographer initially depressing the shutter release button or otherwise providing a shutter release command. The photographer does not need to push the shutter release button again for each photo in the DOF bracketing series. The first photo is taken in response to the camera's controller detecting that a shutter release command has been received, and subsequent photos are taken after the camera settings are adjusted, still in response to the initial shutter release command. Upon taking the photo in 511 the method again proceeds to 513 to determine whether any further DOF bracketing photos are required. If it is determined in 513 that all the photos have been taken for the DOF bracketing series the method proceeds in accordance with the "NO" branch from 513 to 519 where the method ends.

Various activities may be included or excluded as described above, or performed in a different order, with the method still remaining within the scope of at least one exemplary embodiment. Blocks from either FIG. 4 or FIG. 5 may be omitted or altered without departing from the scope of the invention, as would be known by those of ordinary skill in the art.

The invention may be implemented with any sort of processing units, processors and controllers (e.g., Image Processor 111 and Controller 117 of FIG. 1) capable of performing the stated functions and activities. For example, the Image Processor 111 and/or Controller 117 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the memory 113, e.g. hard disk, CD, flash memory, ram, or other computer readable medium as recognized by one of ordinary skill in the art, or the computer software programs may be transmitted wirelessly to the processing unit. The computer software programs can aid or perform the steps and activities described above. For example computer programs in accordance with at least one exemplary embodiment may include: source code for retrieving and implementing the DOF bracketing settings and parameters in block 507, source code for adjusting the initial settings of the camera and determining the distance to the primary subject in block 509, source code for adjusting the aperture in block 515, source code for adjusting the shutter speed in 517, source code for controlling various components of the camera assembly 100 depicted in FIG. 1. There are many further source codes that may be written to perform the stated steps and procedures above, and these are intended to lie within the scope of exemplary embodiments.

The use of the word "exemplary" in this disclosure is intended to mean that the embodiment or element so described serves as an example, instance, or illustration, and is not necessarily to be construed as preferred or advantageous over other embodiments or elements. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of taking depth of field bracketed photos with a camera, the method comprising:
    accepting adjustments for first aperture and shutter speed settings associated with a first depth of field at an exposure level;
    receiving a shutter release command;
    taking a first photo in response to receiving the shutter release command, said first photo being taken at said first aperture and shutter speed settings;
    adjusting the camera to second aperture and shutter speed settings in response to receiving the shutter release command, said second aperture and shutter speed settings being associated with a second depth of field at said exposure level; and
    taking a second photo in response to receiving the shutter release command, said second photo being taken at said second aperture and shutter speed settings.

2. The method of taking a photo of claim 1, further comprising
    adjusting the camera to third aperture and shutter speed settings in response to receiving the shutter release command, said third aperture and shutter speed settings being associated with a third depth of field at said exposure level; and
    taking a third photo in response to receiving the shutter release command, said third photo being taken at said third aperture and shutter speed settings.

3. The method of taking a photo of claim 2, wherein the first photo, the second photo and the third photo are all taken automatically in response to the receiving of the shutter release command only once.

4. The method of taking a photo of claim 2, wherein the second depth of field is less than the first depth of field and the third depth of field it greater than the first depth of field.

5. The method of taking a photo of claim 2, wherein the second depth of field is greater than the first depth of field and the third depth of field is less than the first depth of field.

6. The method of taking a photo of claim 2, wherein a first distance from a first subject to be photographed is within each of the first depth of field, the second depth of field and the third depth of field.

7. The method of taking a photo of claim 6, wherein the first subject is in sharp focus in the first depth of field with the camera set to the first aperture and shutter speed settings.

8. The method of taking a photo of claim 6, wherein a second distance from a second subject to be photographed is beyond a far side of each of the first depth of field and the second depth of field and is not beyond a far side of the third depth of field.

9. The method of taking a photo of claim 8, wherein the first subject in the first depth of field is in sharp focus and the second subject beyond the first depth of field is not in sharp focus with the camera set to the first aperture and shutter speed settings.

10. The method of taking a photo of claim 1, wherein adjusting the camera to second aperture and shutter speed settings includes calculating the second aperture setting and calculating the second shutter speed setting.

11. A set of software instructions stored in an electronic storage media for taking depth of field bracketed photos with a camera, wherein the set of software instructions upon being executed by a controller of the camera causes the camera to:
    accept adjustments for first aperture and shutter speed settings associated with a first depth of field at an exposure level;
    receive a shutter release command;
    take a first photo in response to receiving the shutter release command, said first photo being taken at said first aperture and shutter speed settings;
    adjust the camera to second aperture and shutter speed settings in response to receiving the shutter release command, said second aperture and shutter speed settings being associated with a second depth of field at said exposure level; and take a second photo in response to receiving the shutter release command, said second photo being taken at said second aperture and shutter speed settings.

12. The set of software instructions of claim 11, further causing the camera to:
   adjust the camera to third aperture and shutter speed settings in response to receiving the shutter release command, said third aperture and shutter speed settings being associated with a third depth of field at said exposure level; and
   take a third photo in response to receiving the shutter release command, said third photo being taken at said third aperture and shutter speed settings.

13. The set of software instructions of claim 12, wherein a first distance from a first subject to be photographed is within each of the first depth of field, the second depth of field and the third depth of field.

14. The set of software instructions of claim 13, wherein a second distance from a second subject to be photographed is beyond a far side of each of the first depth of field and the second depth of field and is not beyond a far side of the third depth of field.

15. The set of software instructions of claim 11, further comprising adjusting the shutter speed setting based on direct light measurements.

16. A camera configured to take depth of field bracketed photos comprising:
   user interface controls configured to accept adjustments for first aperture and shutter speed settings associated with a first depth of field at an exposure level;
   a shutter release control configured to receive a shutter release command; and
   a controller configured to control the camera to take a first photo in response to receiving the shutter release command, said first photo being taken at said first aperture and shutter speed settings, adjust the camera to second aperture and shutter speed settings in response to receiving the shutter release command, said second aperture and shutter speed settings being associated with a second depth of field at said exposure level, and take a second photo in response to receiving the shutter release command, said second photo being taken at said second aperture and shutter speed settings.

17. The camera of claim 16, wherein the controller is further configured to adjust the camera to third aperture and shutter speed settings in response to receiving the shutter release command, said third aperture and shutter speed settings being associated with a third depth of field at said exposure level, and take a third photo in response to receiving the shutter release command, said third photo being taken at said third aperture and shutter speed settings.

18. The camera of claim 17, wherein a first distance from a first subject to be photographed is within each of the first depth of field, the second depth of field and the third depth of field.

19. The camera of claim 18, wherein a second distance from a second subject to be photographed is beyond a far side of each of the first depth of field and the second depth of field and is not beyond a far side of the third depth of field.

20. The camera of claim 16, wherein the adjustment of the camera includes calculating the second aperture setting and calculating the second shutter speed setting.

* * * * *